June 14, 1938.  J. SACHS  2,120,575
ELECTRIC METER CONNECTION APPLIANCE
Filed Oct. 24, 1935  2 Sheets—Sheet 1
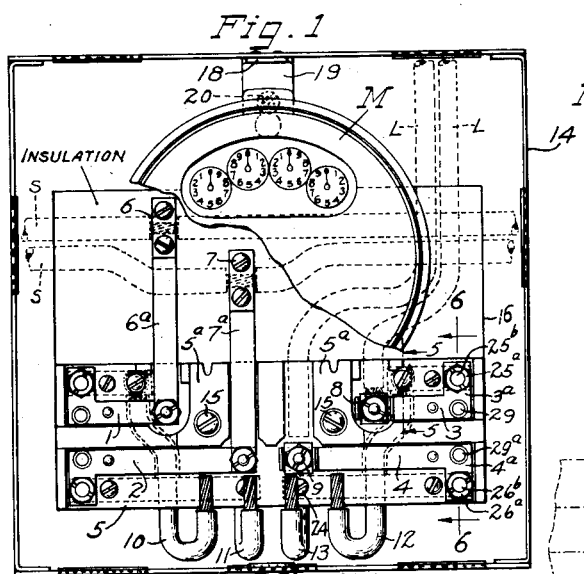
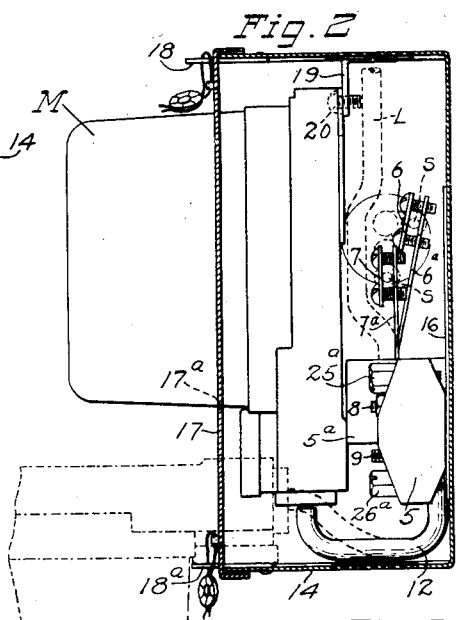
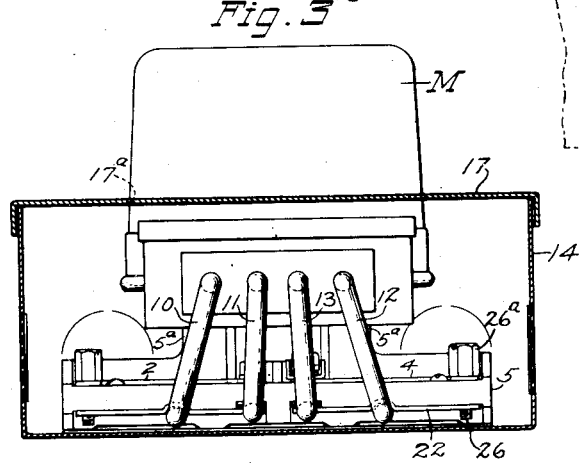
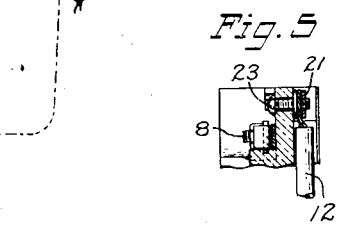
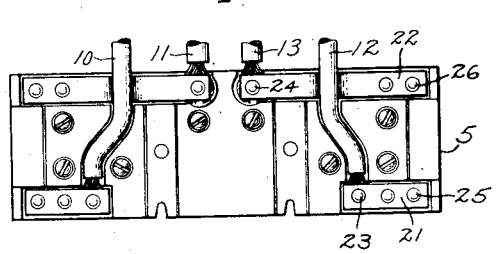
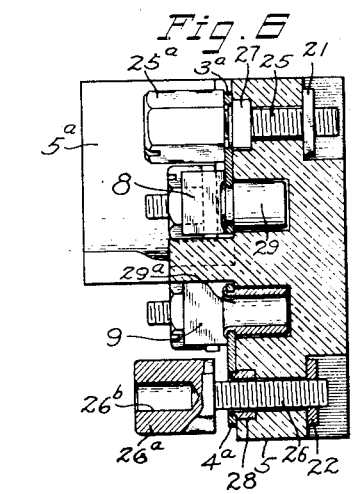
Inventor
Joseph Sachs
By S. Jay Teller
Attorney

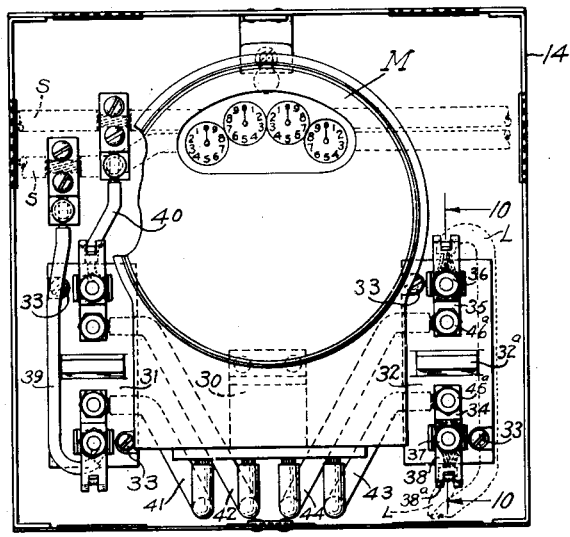

Patented June 14, 1938

2,120,575

UNITED STATES PATENT OFFICE 2,120,575

ELECTRIC METER CONNECTION APPLIANCE

Joseph Sachs, West Hartford, Conn., assignor to Colt's Patent Fire Arms Manufacturing Company, Hartford, Conn., a corporation of Connecticut Application October 24, 1935, Serial No. 46,518

7 Claims. (Cl. 247—2)

Many different types of devices have been devised, constructed and used for providing electrical connections between an electric meter and the line and load wires with which it is associated. These devices have included terminals for the connection of line wires and load wires, and have included conductors, or at least means for the attachment of conductors, leading to the terminals of the meter. Many of these devices have also included switching means, or fuses, or both for interrupting or limiting the current, and some of them have also included specially provided elements or accessories for facilitating the testing of the meter without removing it.

With meters of the conventional type having their terminals at one end, usually the lower end, it has been the usual prior practice to place the meter in vertical register with the connection device, ordinarily above it, and to provide conductors extending in a generally vertical direction between the said meter and the said device. Ordinarily, the connection device, whether including a switch, or a fuse, or both, or neither, has been enclosed in a protective casing, and in many instances the same casing has served to enclose at least the terminal chamber part of the meter so as to prevent unauthorized access to the conductors extending between the connection device and the meter. The arrangement, wherein the meter is vertically spaced from the connection device, has the advantage that the connection device is readily accessible when the front cover of the enclosing casing is opened, but it has the disadvantage that the vertical dimension of the total assembly is in some instances objectionably large.

With the meter above the connection device, as is usual, space must be provided within the enclosing casing and beneath the connection device for the line wires or the load wires or for both. This necessity for wiring space in the casing has still further increased the vertical dimension of the total assembly.

Until recently it has been ordinarily regarded as sufficient for the casing which encloses the connection device to enclose merely the terminal chamber portion of the meter, but it is an increasingly prevalent requirement that the casing shall enclose and surround the entire main body of the meter. In accordance with this more recent practice, the front portion of the meter projects through an opening in the front cover of the casing, or the front cover is extended to entirely enclose the meter and is provided with a window through which the dials of the meter are visible. Obviously, with the meter and the connection device arranged in the before-mentioned conventional relationship a very large and expensive casing would be necessary in order to enclose both of them and also provide the necessary wiring space.

In my copending application for electric meter connection appliance, Serial No. 6,405 filed February 13, 1935, I have disclosed a meter connection device or appliance which avoids the excessive and sometimes seriously objectionable height of the conventional arrangement, and which with little or no added expense complies with the present requirements as to the complete enclosing of the main body of the meter. As there shown, the meter is mounted directly in front of the wiring space and immediately adjacent the connection device, but the meter is connected with the connection device in such a manner that when necessary it may be moved to a forward position at an angle to its normal position without interrupting any electrical connections. It is only necessary for the vertical dimension of the enclosing casing to be a little larger than that of the meter itself, as the required wiring space is provided behind the meter.

The present invention relates to a meter connection device of the general character disclosed in my before-mentioned application, and the principal object of the present invention is to provide a connection device of this type having the parts so arranged that the testing facilities for the meter, or the wire terminals, or both, are exposed and accessible while the meter is in its normal position. In accordance with the present invention, it is not necessary to move the meter out of its normal position, except to obtain access to the wiring space behind the meter or to portions of the insulating block which may be behind the meter.

In the accompanying drawings I have shown several embodiments of the invention, but it will be understood that the drawings are intended for illustrative purposes only and are not to be construed as defining or limiting the scope of the invention, the claims forming a part of this specification being relied upon for that purpose.

Of the drawings:

Fig. 1 is a front view of an appliance embodying the invention, with the meter in place. In this view the front cover of the casing is omitted and a portion of the meter is broken away to more clearly show portions of the connection device.

Fig. 2 is a side view of the parts shown in Fig. 1, the enclosing casing with its cover being shown in vertical section.

Fig. 3 is a bottom view of the meter connection device, the enclosing casing being shown in transverse section.

Fig. 4 is a rear view of the insulating block and the parts mounted thereon.

Fig. 5 is a vertical sectional view taken along the line 5—5 of Fig. 1.

Fig. 6 is an enlarged vertical sectional view taken along the line 6—6 of Fig. 1.

Fig. 7 is a view similar to Fig. 1 but showing an alternative embodiment of the invention.

Fig. 8 is a side view of the parts shown in Fig. 7, the enclosing casing with its cover being shown in vertical section.

Fig. 9 is a bottom view of the connection device as shown in Fig. 7, the enclosing casing being shown in transverse section.

Fig. 10 is an enlarged vertical sectional view taken along the line 10—10 of Fig. 7.

Fig. 11 is a view similar to Fig. 9 but showing another alternative embodiment of the invention.

In accordance with the invention, as shown particularly in Figs. 1 to 6, there are provided conducting elements connectible to stationary circuit wires. Preferably there are two conducting elements 1 and 2 connectible to stationary line wires, such as S, S, and two other conducting elements 3 and 4 connectible to stationary load wires, such as L, L. Portions of at least two of these elements are held in fixed relationships to a rear supporting wall and preferably portions of all four of them are so held. Ordinarily the said elements are carried by an insulating means or block 5, and they have wire terminals such as 6, 7 and 8, 9. As shown, the terminals 6 and 7 are mounted on vertical conductors 6ª and 7ª and the terminals 8 and 9 are solderless terminals mounted directly upon the conducting elements 3 and 4. Also carried by the block 5, or at least electrically connected with the conducting elements 1, 2 and 3, 4 are conducting means 10, 11 and 12, 13 which are electrically connectible with the several terminals of the meter M.

Ordinarily there is an enclosing casing, such as 14, and the block 5 is secured to the rear wall of the casing, as for instance by means of screws 15, 15. An insulating sheet 16 may be provided at the rear of the block, this sheet extending upward along the rear wall of the casing.

The casing 14 may vary as to size and shape, but it is preferably relatively small, its vertical dimension being not greatly in excess of the vertical dimension of the largest meter with which the appliance is to be connected. As shown, the casing 14 is approximately square and its side and end walls are permanently connected with each other, by welding or otherwise. As to this latter feature, I do not limit myself, as will be presently explained. The casing 14 is provided with the usual conduit knockouts, as shown.

The front cover 17 of the casing may be held in various ways, but as shown it is provided with slots at the top and bottom through which project tongues 18 and 18ª on the top and bottom walls of the casing. The tongues 18 and 18ª have openings therein through which can be inserted suitable locks or seals.

Means is provided for releasably supporting a meter, such as M, adjacent the conducting elements 1, 2 and 3, 4 and adjacent the block 5. The meter M is spaced forward from the rear wall of the casing so that a wiring space is provided between the meter and the said rear wall. The meter is located in such position that the major portion of the block 5 is between horizontal planes through the top and bottom of the meter, and the said meter may be located in front of the central portion of the block 5, as shown in Figs. 1 and 2. When there is an enclosing casing, such as 14, the supporting means may comprise a bracket 19 secured to the top wall of the casing and having a screw 20 adapted to extend through an inverted keyhole slot in the top of the meter. The meter is also supported in part by integral lugs 5ª, 5ª projecting forward from the block 5. The front cover 17 of the casing is adapted to cooperate with the particular meter with which the device is to be used. When several different meters are in use different interchangeable covers are provided for the respective meters.

Preferably the meter is normally positioned with at least the terminals thereof within the casing and behind a plane through the front edges thereof, and the openable front cover for the casing has the plane of the main portion thereof in front of the said terminals of the meter, the said cover being constructed to permit the dials of the meter to be visible from the front.

As shown, the cover 17 has an opening 17ª therein which is of such diameter as to approximately fit the forward projecting portion of the meter M. It will be seen that when the cover 17 is in place the meter is supported by the screw 20 and is held in place by the cover and by the lugs 5ª on the block 5. However, when the cover 17 is removed and the screw 20 is loosened, the meter may be lifted slightly and then moved out of the normal position shown in Fig. 2. When the meter is moved as aforesaid the wiring space at the rear thereof is exposed at the front.

The conducting means 10, 11 and 12, 13 may differ widely in construction. The said conducting means preferably extend directly from the block 5 to the terminals of the meter and their rear portions remain in normal mechanical and electrical connection with the block and its terminals when the meter is moved forward. As shown, the said conducting means are free from any direct support upon the openable front cover 17. The construction of the said conducting means is such that they are adapted to permit the meter to be freely moved forward without any preliminary or preparatory manipulation of or disconnection of the said conducting means. As shown, the forward end portions of the said conducting means are adapted to directly engage the meter terminals and are movable relatively to the conductors 1, 2 and 3, 4 and relatively to the block 5 so as to permit the meter to be moved out of its normal position to a position wherein the block 5 and wiring space are substantially entirely exposed at the front. The character of the meter movement may be varied, but I prefer and have shown an angular or swinging movement to a position at an angle to its normal position, as shown by dot-and-dash lines in Fig. 2. As shown in Figs. 1 to 6, the said conducting means 10, 11 and 12, 13 are flexible and can be flexed or bent to permit the meter to be moved as aforesaid. It will be understood that the flexible conductors 10, 11 and 12, 13 are suitably insulated, as shown. The flexible conductors are of sufficient strength to assist in supporting the meter in its forward position.

In originally installing the appliance, the casing can be mounted upon its support in the usual way, and prior to the installation of the meter the service and load wires can be connected with the terminals 6, 7 and 8, 9, as indicated for instance in Fig. 1. Conduits for the wires may be connected at any of the knockouts and the positions of the conduits and of the wires may obviously be varied to suit the requirements of the particular installation. It will be observed that the line and load wires are behind the meter position and above the block 5, so that wiring space is provided without any increase in the vertical dimension of the casing 14.

After the line and load wire connections have been made, the free ends of the flexible conductors 10, 11 and 12, 13 can be inserted in the meter and connected with the terminals thereof in the usual way. The meter may be in an angular position while such connections are being made, and then the meter can be moved to its normal vertical position, as shown in Fig. 2, and can be secured in place by means of the screw 20. Thereafter the cover 17 can be put in place and locked or sealed. It will be observed that with the described arrangement the entire installation, including the meter and the meter connection appliance, is very compact and has a minimum vertical dimension. The enclosing casing is much smaller than it would be if the meter were arranged in conventional relationship with the connection device. The casing, when closed and sealed, gives effective protection against theft of current.

In the event that it becomes necessary or desirable to obtain access to the line or load wires or the terminals therefor on the central portion of the block 5, such access can be readily had by removing the cover 17 and then releasing the meter from the screw 20 and moving it to the position shown by dot-and-dash lines in Fig. 2. It will be observed that the electrical connections with the meter are maintained notwithstanding the movement thereof.

The appliance as shown in Figs. 1 to 6 is particularly adapted and constructed to facilitate the testing of the meter, and the arrangement of the parts is such that meter testing can be effected without moving the meter from its normal upright position. To this end the several conducting elements 1, 2 and 3, 4, instead of being electrically connected directly with the flexible conductors 10, 11 and 12, 13, are connected indirectly therewith by means of manual operable connecting elements or connectors which will be described. Reference will be had particularly to the parts at the right hand side of the block, it being understood that the parts at the left hand side are the same in construction except for reversal.

Mounted in suitable recesses or grooves on the back of the insulating block 5 are transversely extending conductor straps 21 and 22. The flexible conductor 12 is electrically connected with the transverse strap 21 in the manner shown in Fig. 5, being held in place by the screw 23. The flexible conductor 13 is similarly connected with the transverse strap 22, being held in place by the screw 24.

The conducting elements 3 and 4 are provided respectively with off-set portions 3ª and 4ª, the upper end of the portion 3ª being in front of the right hand end of the conducting strap 21, and the lower end of the portion 4ª being directly in front of the right hand end of the conducting strap 22. A screw 25 constitutes a connecting element or connector which normally electrically connects the conducting elements 3 and 21, and a similar screw 26 constitutes a connecting element or connector which normally connects the conducting elements 4 and 22. As shown more particularly in Fig. 6, the screws 25 and 26 are threaded directly into the conducting straps 21 and 22, but extend through the large holes in the conducting elements 3ª and 4ª. Insulating bushings 27 and 28 surround the threaded portions of the screws 25 and 26 and prevent them from contacting with the said conducting elements 3ª and 4ª. The screws 25 and 26 have large heads 25ª and 26ª which normally engage respectively with the conducting elements 3ª and 4ª to establish the desired electrical connections. However, by partly backing out either of the screws the electrical connection between the corresponding conducting elements can be broken. In Fig. 6 the screw 26 is shown backed out for this purpose.

It will be observed that by means of the construction shown, any one of the flexible conductors 10, 11, 12 or 13 can be electrically disconnected from its corresponding circuit wire by backing out the corresponding screw or connecting element.

In order that temporary by-pass connections may be easily put in place between line wires and load wires, and in order that meter testing circuits may be conveniently established, the screw heads 25ª and 26ª are provided with recesses 25ᵇ and 26ᵇ; and metallic bushings 29 and 29ª are secured to the conducting elements 3 and 4. Flexible conductors (not shown) are provided for by-passing and testing purposes, these conductors having at their ends suitable plugs adapted to enter the socket holes at 25ᵇ, 26ᵇ, 29 and 29ª. By means of such flexible conductors any desired by-pass or other electrical connections can be established. It will be observed that it is not necessary to move the meter in effecting testing.

In Figs. 7 to 10, I have shown an alternative embodiment of the invention wherein the insulating means for supporting the wire terminals comprises two separate insulating blocks instead of a single insulating block such as 5. As shown in these figures, the casing 14 and the cover 17 are or may be of the same construction as the casing and cover already described and repetition of the description is unnecessary. The lower end of the meter, instead of being supported on a portion of the insulating block, is supported upon a bracket 30 secured to the rear wall of the casing.

Two insulating blocks 31 and 32 are provided which are or may be identical in construction, and a description of one of them will therefore serve for both. These two blocks are secured to the rear wall of the casing by screws 33, 33 and they are spaced apart transversely or horizontally and are so related to the meter as to be exposed at the front when the meter is in its normal upright position, as shown in Fig. 7.

Referring particularly to the block 32 which is shown in detail in Fig. 10, it will be observed that this block has on the front thereof two short vertical conductors 34 and 35 which are spaced apart vertically, there preferably being a forward projecting insulating wall 32ª between them. At the upper end of the conductor 34 and at the lower end of the conductors 35 are suitable wire terminals 36 and 37. The terminal 37 is shown in section in Fig. 10 and consists of a forward extending screw 37ᵃ which is threaded into the conductor 34 to hold it in place. A nut 37ᵇ is provided on the screw 37ᵃ, and a flat metallic plate or washer 38 is provided adjacent the nut 37ᵇ. The end of the corresponding circuit wire to be connected is clamped between the plate 38 and the conducting element 34.

The load wires L, L are directly connected with the terminals 36 and 37 on the block 32, as shown in Fig. 7. The line wires S, S may be directly connected with the corresponding terminals on the block 31, but they are shown as being indirectly connected therewith by means of intermediate conductors 39 and 40.

Flexible conductors 41, 42 and 43, 44 similar in construction and in purpose to the described flexible conductors 10, 11 and 12, 13 are provided, the conductors 41, 42 being connected with the block 31, and the terminals 43, 44 being connected with the block 32. The flexible conductors 43 and 44 are electrically connectible respectively with the vertical conductors 34 and 35 on the block 32, and the manner of connection is clearly shown in Fig. 10. The conductors 43 and 44 are spread out as shown and are clamped between washers held by screws 45 and 46 which are threaded into nuts 47 and 48. The screws 45 and 46 are electrically connected respectively with the conducting elements 34 and 35.

It will be observed that with the construction as thus far described, the circuit wire terminals are exposed and accessible at the sides of the meter with the meter in its normal position.

Preferably the screws 45 and 46 are connected with the conducting elements 34 and 35 by means of manually operable connecting elements or connectors. As shown, the screws 45 and 46 extend through large holes in the respective conducting elements 34 and 35 and are surrounded by insulating bushings 49 and 50 which prevent the screws from contacting with the said conducting elements. The screws 45 and 46 are provided with nuts 45ᵃ and 46ᵃ constituting connecting elements or connectors which normally engage respectively with the corresponding conducting elements to establish the desired electrical connections. However, by partly unscrewing either of the nuts the electrical connection with the corresponding conducting element can be broken. In Fig. 10 the nut 45ᵃ is shown as partly unscrewed for this purpose.

It will be observed that by means of the construction shown any one of the flexible conductors 41, 42, 43 or 44 can be electrically disconnected from its corresponding circuit wire by unscrewing the corresponding nut or connecting element.

In order that by-pass or other connections may be conveniently attached for testing purposes the following facilities are provided. The nuts 36ᵇ, 37ᵇ 45ᵃ and 46ᵃ are provided with socket apertures to receive plug terminals as already described in connection with Figs. 1 to 6; the said nuts are also provided with annular grooves so as to be thereby adapted to be more conveniently engaged by a terminal clamp; and each of the washers or plates 38 for clamping the circuit wires is provided with an extension such as 38ᵃ having offset ears and adapted to be engaged by a terminal clamp. The described construction makes it possible for the connection device to be used with different types of testing instrumentalities, and any desired by-pass or other electrical connections can be readily established. It will be observed that it is not necessary to move the meter in effecting testing.

In Fig. 11 I have shown an alternative construction which is very similar to that shown in Figs. 7 to 10 with the exception that the two insulating blocks 51 and 52 are considerably thicker than the blocks 31 and 32, thus bringing the electrical parts nearer the front of the box and making them more readily accessible. The construction may be otherwise similar to what is shown in Figs. 7 to 10, and repetition of the description is unnecessary. The enclosing box may be somewhat wider than what is shown in Fig. 7 in order to avoid interference between the meter and the blocks 51 and 52.

For the sake of simplicity, I have shown a casing for a single meter, but it will be understood that the invention is particularly useful in a troughing installation, wherein there are two or more meters associated with a single casing or trough and served by a single set of bussing wires such as S, S.

What I claim is:

1. In an electric meter connection device, the combination of an enclosing casing, releasable means in the casing for normally supporting a meter near the front thereof with the rear of the meter spaced forward from the rear casing wall so as to provide a wiring space between the said meter and wall, the said supporting means permitting the meter when released to move to a position wherein the said wiring space is exposed at the front, insulating means mounted on the said rear casing wall with a substantial portion thereof between horizontal planes through the top and bottom of a meter supported as aforesaid, terminals on the said insulating means adapted for electrical connection with circuit wires, conducting means mechanically connected with the insulating means and adapted to electrically connect the said circuit wire terminals with the meter terminals and to permit the meter to move as aforesaid, and a connector on the insulating means additional to the said circuit wire terminals and normally electrically connecting one of the said wire terminals with one of the conducting means, the said connector being so positioned with respect to the meter as to be accessible from the front when the meter is in normal position and the said connector being manually movable to break the electrical connection between the last said wire terminal and the corresponding conducting means.

2. In an electric meter connection device, the combination of an enclosing casing, releasable means in the casing for normally supporting a meter near the front thereof with the rear of the meter spaced forward from the rear casing wall so as to provide a wiring space between the said meter and wall, the said supporting means permitting the meter when released to move to a position wherein the said wiring space is exposed at the front, insulating means mounted on the said rear casing wall with a substantial portion thereof between horizontal planes through the top and bottom of a meter supported as aforesaid, at least two terminals on the insulating means adapted for electrical connection with two circuit wires, at least two conducting means mechanically connected with the insulating means and adapted to electrically connect the said circuit wire terminals with two of the meter terminals and to permit the meter to move as aforesaid, and two connectors on the insulating means additional to the said two circuit wire terminals and normally electrically connecting the said wire terminals with the said two conducting means, the said connectors being transversely spaced and located at opposite sides of the meter and so positioned with respect to the meter as to be accessible from the front when the meter is in normal position and the said connectors being manually movable to break the respective electrical connections between the said wire terminals and conducting means.

3. In an electric meter connection device, the combination of an enclosing casing, releasable means in the casing for normally supporting a meter near the front thereof with the rear of the meter spaced forward from the rear casing wall so as to provide a wiring space between the said meter and wall, the said supporting means permitting the meter when released to move to a position wherein the said wiring space is exposed at the front, insulating means mounted on the said rear casing wall with a substantial portion thereof between horizontal planes through the top and bottom of a meter supported as aforesaid, terminals on the insulating means adapted for electrical connection with circuit wires, conducting means mechanically connected with the insulating means and adapted to electrically connect the said circuit wire terminals with the meter terminals, the said conducting means having their forward portions movable to permit the meter to move as aforesaid while maintaining the electrical connections thereto, and a connector on the insulating means additional to the said circuit wire terminals and normally electrically connecting one of the said wire terminals with one of the said conducting means, the said connector being so positioned with respect to the meter as to be accessible from the front when the meter is in normal position and the said connector being manually movable to break the electrical connection between the last said wire terminal and the corresponding conducting means.

4. In an electric meter installation, the combination of an enclosing casing, a meter at the front of the casing normally positioned with at least the terminals thereof within the casing and behind a plane through the front edges thereof, the said meter being releasably held so that it may be moved forward when desired, an openable front cover for the casing having the plane of the main portion thereof in front of the said terminals of the meter, the said cover being constructed to permit the dials of the meter to be visible from the front, insulating means in the casing near the rear thereof and fastened directly to the casing independently of the cover, a substantial portion of the said insulating means being positioned between horizontal planes through the top and bottom of the meter, terminals on the insulating means and within the casing adapted for electrical connection with circuit wires, a plurality of conducting means normally entirely within the casing and behind the said plane through the front edges thereof, the said conducting means extending directly from the said insulating means to the meter terminals and being free from direct support upon the openable cover and the said conducting means serving to electrically connect the said circuit wire terminals directly with the meter terminals and to permit the meter to be moved forward as aforesaid independently of the insulating means, and a plurality of connectors on the insulating means additional to the said circuit wire terminals and each electrically connecting one of the said wire terminals with one of the said conducting means, the said connectors being transversely spaced and located at opposite sides of the meter and so positioned with respect to the meter as to be accessible from the front when the meter is in normal position and each of the said connectors being manually movable to break the electrical connection between the last said wire terminal and the corresponding conducting means.

5. In an electric meter connection device, the combination of an enclosing casing, an insulating block mounted on the rear casing wall, terminals on the block adapted for electrical connection with circuit wires, releasable means for normally supporting a meter near the front of the casing and in front of the central portion of the said block and spaced forward from the rear casing wall to provide a wiring space between the said meter and wall, the said supporting means permitting the meter when released to move to a position wherein substantially the entire block and the said wiring space are exposed at the front, a plurality of conducting means mechanically connected with the block behind the meter and adapted to be electrically connected with the meter terminals, the said conducting means having their forward portions movable relatively to the block to permit the meter to move as aforesaid while maintaining the electrical connections thereto, and a plurality of connectors additional to the said circuit wire terminals and positioned on the block at opposite sides of the meter so as to be accessible from the front when the meter is in normal position, the said connectors normally electrically connecting the said wire terminals with the said movable conducting means and being manually movable to break the electrical connections between the said wire terminals and conducting means.

6. In an electric meter connection device, the combination of an enclosing casing, releasable means in the casing for normally supporting a meter near the front thereof with the rear of the meter spaced forward from the rear casing wall so as to provide a wiring space between the said meter and wall, the said supporting means permitting the meter when released to move to a position wherein the said wiring space is exposed at the front, two insulating blocks mounted on the rear wall of the casing and spaced apart transversely so as to be at opposite sides of the said wiring space and so as to be exposed and accessible at opposite sides of the meter when the meter is in normal position, terminals on the respective blocks adapted for electrical connection with circuit wires, and a plurality of conducting means located in part in the said wiring space and electrically connected with the wire terminals on the respective blocks and adapted to be electrically connected with the meter terminals, the said conducting means serving to electrically connect the said wire terminals with the meter terminals and to permit the meter to move as aforesaid while maintaining the electrical connections thereto.

7. In an electric meter connection device, the combination of an enclosing casing, releasable means in the casing for normally supporting a meter near the front thereof with the rear of the meter spaced forward from the rear casing wall so as to provide a wiring space between the said meter and wall, the said supporting means permitting the meter when released to move to a position wherein the said wiring space is exposed at the front, two insulating blocks mounted on the rear wall of the casing and spaced apart transversely so as to be at opposite sides of the said wiring space and so as to be exposed and accessible at opposite sides of the meter when the meter is in normal position, terminals on the respective blocks adapted for electrical connection with circuit wires, a plurality of conducting means located in part in the said wiring space and electrically connected with the wire terminals on the respective blocks and adapted to be electrically connected with the meter terminals, the said conducting means serving to electrically connect the said wire terminals with the meter terminals and to permit the meter to move as aforesaid while maintaining the electrical connections thereto, and connectors on the respective blocks normally electrically connecting the said wire terminals with the said conducting means, the said connectors being additional to the said wire terminals and being so positioned with respect to the meter as to be accessible from the front when the meter is in normal position and the said connectors being manually movable to break the electrical connections between the said wire terminals and conducting means.

JOSEPH SACHS.